(12) United States Patent
Henninger

(10) Patent No.: US 11,926,484 B2
(45) Date of Patent: Mar. 12, 2024

(54) DEVICE AND METHOD FOR CONVEYING PRODUCTS

(71) Applicant: SIDEL PARTICIPATIONS, Octeville-sur-Mer (FR)

(72) Inventor: Raphaël Henninger, Reichstett (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 107 days.

(21) Appl. No.: 17/779,548

(22) PCT Filed: Nov. 27, 2020

(86) PCT No.: PCT/EP2020/083664
§ 371 (c)(1),
(2) Date: May 24, 2022

(87) PCT Pub. No.: WO2021/105381
PCT Pub. Date: Jun. 3, 2021

(65) Prior Publication Data
US 2023/0011872 A1 Jan. 12, 2023

(30) Foreign Application Priority Data
Nov. 28, 2019 (FR) ...................................... 1913376

(51) Int. Cl.
*B65G 43/08* (2006.01)
*B65G 47/26* (2006.01)
*G06M 7/04* (2006.01)

(52) U.S. Cl.
CPC .......... *B65G 43/08* (2013.01); *B65G 47/268* (2013.01); *G06M 7/04* (2013.01); *B65G 2203/0241* (2013.01); *B65G 2203/044* (2013.01)

(58) Field of Classification Search
CPC .............................. B65G 43/08; B65G 47/268; B65G 2203/042; B65G 43/10; G06M 7/04
(Continued)

(56) References Cited

U.S. PATENT DOCUMENTS 4,364,766 A * 12/1982 Nitschke ............... C03B 35/164
198/460.1
4,635,784 A 1/1987 Bourgeois
(Continued)

FOREIGN PATENT DOCUMENTS

DE 4129135 A1 * 3/1992 ............ B65G 47/31
DE 102012004473 A1 9/2013
(Continued)

OTHER PUBLICATIONS

International Search Report dated Feb. 8, 2021 for PCT/EP2020/083664.

*Primary Examiner* — James R Bidwell

(57) ABSTRACT

A device for conveying products within an industrial line, comprising a conveyor transporting a stream of products along at least one line. The device comprises at least one main zone delimited by primary beacons and covering a segment of the stream; and above the conveyor, at least one member for detecting the primary beacons and for counting the number of products at least inside the main zone. Also a method for conveying products, in which a stream of products is transported along at least one line and, by means of primary beacons at least one main zone is delimited, covering a segment of the stream; the primary beacons are detected and the number of products in the main zone is counted.

20 Claims, 2 Drawing Sheets

Figure 1:
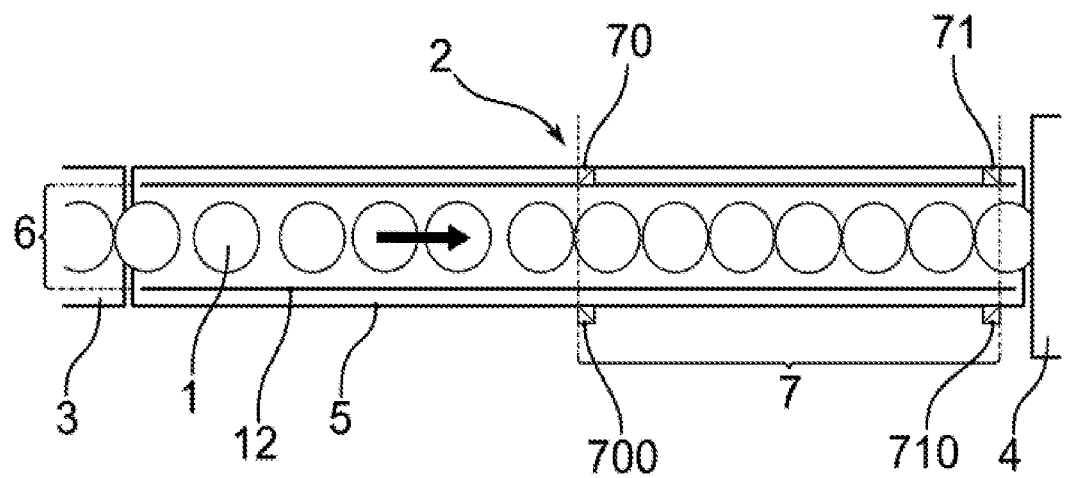

(58) Field of Classification Search
USPC .................................................. 198/460.1
See application file for complete search history.

(56) References Cited

U.S. PATENT DOCUMENTS

| | | | | |
|---|---|---|---|---|
| 11,498,772 | B2* | 11/2022 | Beyer | B65G 47/53 |
| 2014/0224617 | A1* | 8/2014 | Kalkhoff | B65B 57/16 |
| | | | | 198/341.01 |
| 2021/0292100 | A1* | 9/2021 | Schroader | B65G 43/08 |

FOREIGN PATENT DOCUMENTS

| | | | | |
|---|---|---|---|---|
| JP | 2011088741 | A | 5/2011 | |
| WO | 2007000441 | A1 | 1/2007 | |
| WO | 2023/015029 | A1 * | 2/2023 | B65G 43/08 |

* cited by examiner

DEVICE AND METHOD FOR CONVEYING PRODUCTS

The present invention falls within the field of the conveying of products in an industrial line.

As expressed in the present invention, the term "product" encompasses any individual object or several objects grouped together, notably in the form of batches or bundles. Such a product is a container, such as a bottle or a flask, or even a brick pack or a can. Such a product can be made of any type of material, notably of plastic material, of metal or even of glass. A product can be rigid or semi-rigid.

Such a container is intended to contain, in a non-exhaustive manner, a fluid, a liquid, powders or granules, notably of agrifood or cosmetic type.

In the context of the invention, a product can have any type of form, symmetrical or not, regular or irregular.

As is known, in an industrial line, the products can receive several different successive treatments, ranging from the production of the container by a forming operation to the batch packaging of several products grouped together, notably after being filled. At the end of these treatments, the products are said to be "finished".

During these various steps, the products are transported in a direction of movement, from upstream to downstream, between different stations dedicated to each treatment that the products have to undergo. Such transportation is performed via a conveying device.

A conveying device is provided with at least one conveyor that moves in said direction of movement, ensuring the transportation of a stream of products from an upstream station to a downstream station.

An example of conveyor is provided with a movable surface, of endless belt type, on the top face of which the products rest on their bottom. The movement of said movable surface then ensures the conveying of the stream of products.

More specifically, at least one upstream station can feed the conveying device at the input with a stream of products, either in single-file, namely one by one, following one another in a line, or in several lines side-by-side, in "multiline" fashion. Given the rate of production linked to this upstream station, the conveying device must maintain a transportation speed that is proportional to the flow rate of products supplied by said upstream station. As an example, an upstream station can be a filling unit, performing a unitary treatment of each product, that it delivers, in normal operation, in a continuous stream at regular intervals.

Similarly, the downstream station is supplied with said stream of products transported by the conveying device. This downstream station has a rate of operation which is specific to it, dependent notably on the number of products that it has to treat simultaneously. Consequently, it is necessary to synchronize the upstream and downstream stations with one another, as well as the speed of transportation of the conveying device, in order to maintain a continuous supply of products to said downstream station. Generally, in an industrial line, it is the station with the slowest rate which imposes its pace on the other stations of the line. As an example, a downstream station can be a labeling unit successively treating each of the products, or else a bundling machine intended to wrap and hold a batch of several products grouped together.

In order to improve flexibility in the operation of a production line, intermediate stations make it possible to accumulate a quantity of products, between an upstream station and a downstream station. Such a station makes it possible to manage the momentarily different rates from one machine to another, to limit the loss of productivity linked to a momentary malfunction of an upstream or downstream station and to allow the upstream station to be emptied. As an example, the accumulation stations make it possible to build up a reserve of products and ensure, for a time period, a continuous supply of said downstream station, even in the event of a malfunction or of slowing down of an upstream station, when one machine is being emptied.

In this context, it is understood that it is necessary to control the stream of products transported by the conveying device, in order to ensure the continuity of said stream, in particular the number of products present in each line. In particular, it is important to ensure the presence of the correct number of products, with, if necessary, the quantity required for each line, to avoid an imbalance between the lines which would be prejudicial to the downstream treatment, notably when the downstream station is a tight packing machine or a boxing machine.

In fact, a product may happen to be ejected or removed from the stream of products, because of a nonconformity or else when sampling, for example for a quality inspection, generating a prejudicial gap in the stream feeding the downstream station. Furthermore, in the case of a compact stream of products, in which they are attached to one another, "nose-to-tail", a possible slowing down or temporary stoppage of the upstream station can generate an undesirable gap between certain products of said stream. On the other hand, when it is the downstream station which is faulty, a jam of products can take place. In particular, certain treatments, such as the bundling or the boxing of groups of products, require a compact stream with products attached one after the other, "nose-to-tail", with, in each line, the same number of products. In such zones, where it is desirable for the products to be "nose-to-tail", it is therefore necessary to check that that is actually the case.

Currently, a counting of the products is performed by means of a sensor for each line. Such a sensor generally detects the products from the side in their progress, targeting the body of each product passing opposite said sensor.

Such a solution presents a number of drawbacks. First of all, since the sensor is positioned at one location of the conveyor, no check is performed downstream of the sensor, which does not make it possible to ensure the checking of the continuity of a stream if a product is taken after passing said sensor. There can therefore be no assurance, without multiplying the number of sensors, that each line does indeed contain the same number of products.

In addition, it is sometimes necessary to set the position of the sensors according to the type of products to be detected, which creates a waste of time in the transition between two productions of different product sizes.

For example, in the case of products with specific forms, notably a body with a concave part, a sensor positioned on the side with a beam oriented laterally toward the body of the products is likely to detect a gap between products, because of their concave form, even though they are indeed attached. In such a particular case, the setting of each sensor becomes complex and often generates detection errors.

The aim of the invention is to at least partly mitigate the drawbacks of the state of the art by proposing a conveying device that ensures a systematic counting of the products present at any instant in at least one zone. Consequently, even in the case of the removal of a product, for example manually by an operator, the counting of the products is immediately updated.

Moreover, the fact that the products are counted in a predefined zone, rather than their spacing being evaluated using presence detection cells, makes it possible to overcome the abovementioned drawbacks linked to the often necessary setting upon a change of format, and to easily determine whether the products are or are not attached.

For this, the invention relates to a device for conveying products in an industrial line, comprising at least one conveyor transporting a stream of products in at least one line.

Said conveying device is characterized in that it comprises:
- at least one main zone delimited by primary beacons and covering a section of said stream; and
- above said conveyor, at least one member for detecting said primary beacons and for counting the number of products at least in said main zone.

According to additional and nonlimiting features, said main zone can be delimited by at least two primary beacons positioned at each upstream and downstream end of said main zone.

Said conveying device can comprise an additional zone situated upstream of said main zone and covering another section of said stream; said additional zone being delimited by at least one primary beacon in said main zone and by at least one additional primary beacon situated at the upstream end of said additional zone; said member ensuring the detection of said at least one additional primary beacon and the counting of the number of products in said additional zone.

Said stream can comprise several lines of products; each line being delimited by at least two pairs of longitudinally aligned secondary beacons, said pairs being positioned on either side of each line; said member then ensuring the detection of said secondary beacons and the counting of the number of products for each of said lines.

Said conveying device can comprise longitudinal guides, delimiting a guiding corridor for each line of products; said secondary beacons being fixed onto said longitudinal guides.

The main zone can comprise a downstream output end to a downstream station.

Said conveying device can comprise means for comparing the number of products of each zone and of each line to at least one determined value; said comparison means comprising a notification issuing means.

Said detection and counting member can comprise at least one beam covering at least said main zone.

Said detection and counting member can be a camera.

The invention relates also to a method for conveying products in an industrial line, in which at least one conveyor is used to transport a stream of products in at least one line.

Said conveying method is characterized in that it comprises at least the following steps:
- primary beacons are used to delimit at least one main zone covering a section of said stream;
- said primary beacons are detected and the number of products is counted at least in said main zone.

According to additional and nonlimiting features, additional primary beacons can be used to delimit at least the upstream end of an additional zone upstream of said main zone;
said additional primary beacons are then detected;
the number of products in said additional zone is counted.

Said stream can comprise several lines and each line can be delimited by at least two pairs of longitudinally aligned secondary beacons, said pairs being positioned on either side of each line; said secondary beacons are then detected and the products of each line are counted.

The number of products of each zone and of each line can be compared to at least one determined value; and a notification can be issued based on said comparison.

Thus, through the use of beacons to define one or more zones and a member for detecting said beacons and for counting products in each zone and, if necessary, for each line, it is no longer necessary to set a product detection cell, notably when changing product formats.

Furthermore, the invention advantageously makes it possible to regulate the speed of the conveyor, to ensure the accumulation of the products before a downstream station to a desirable point, when the downstream station requires a supply of products accumulated at its input.

Moreover, in a multiline stream of products, the invention advantageously makes it possible to ensure that the same number of products is fed into each line.

Figure 2:
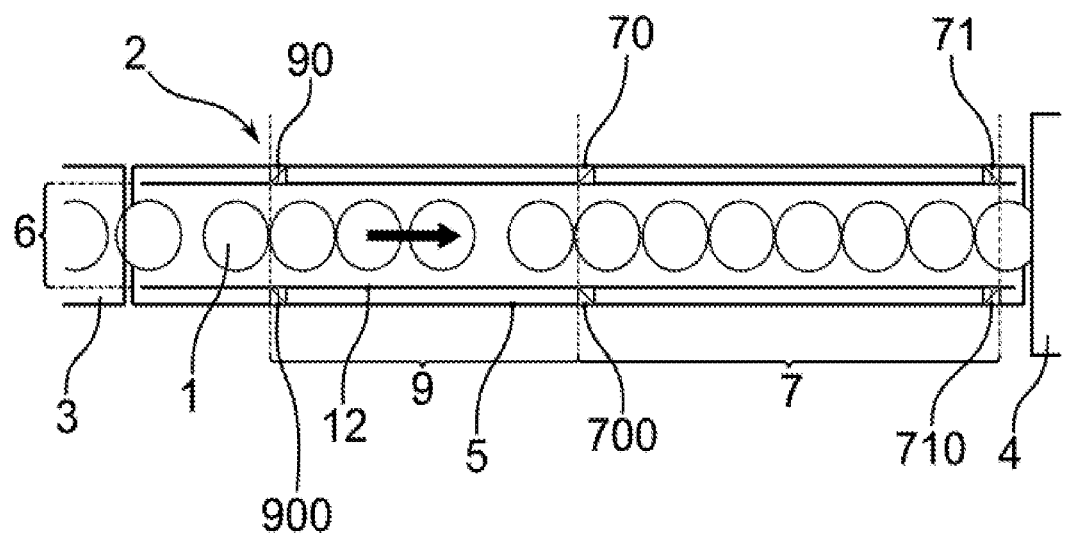
Figure 3:
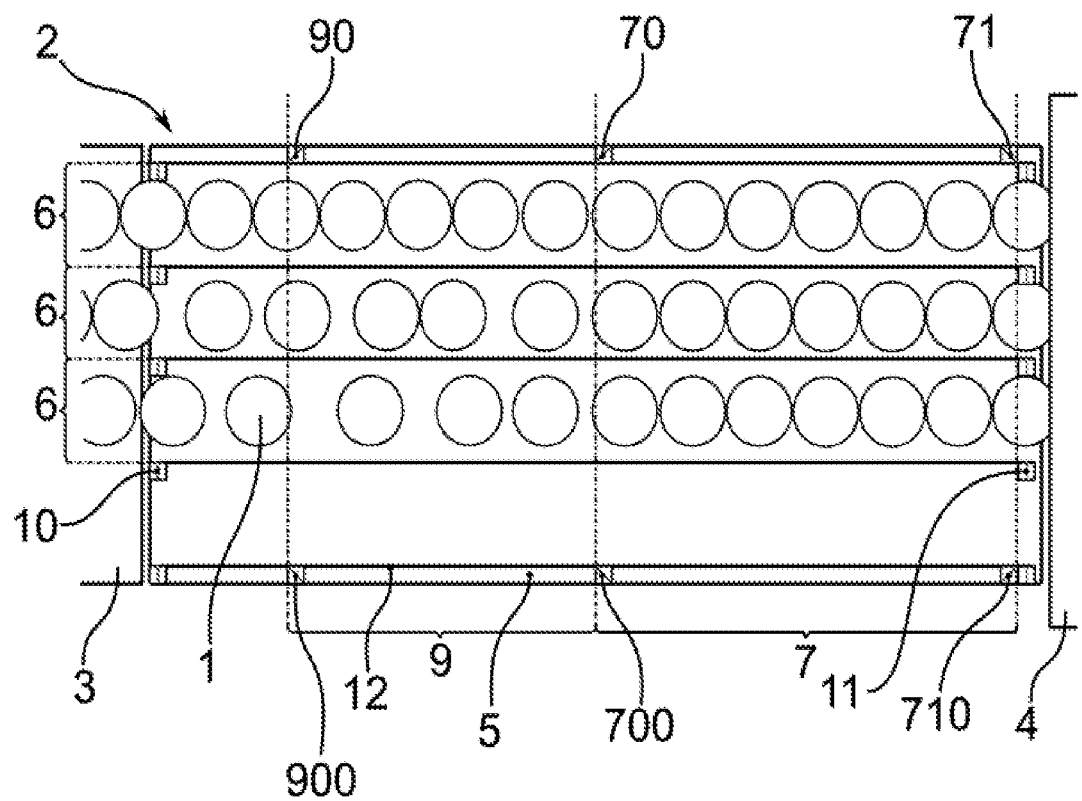
Figure 4:
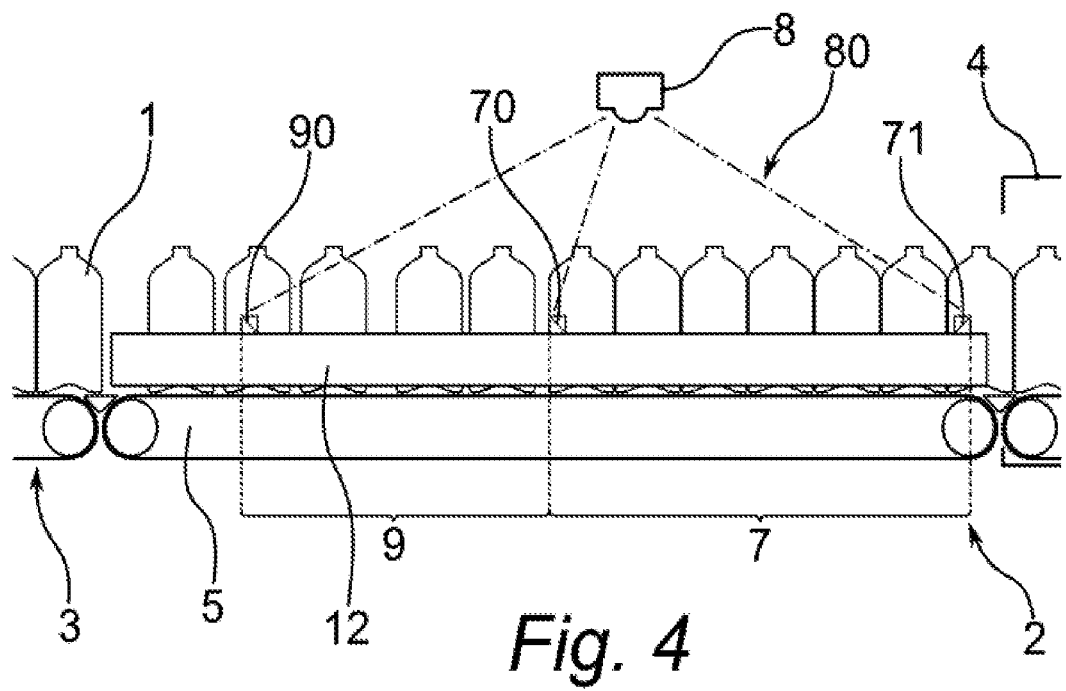

Other features and advantages of the invention will emerge from the following detailed description of the nonlimiting embodiments of the invention, with reference to the attached figures, in which:

FIG. 1 schematically represents a simplified view in elevation of a first embodiment of a device according to the invention, notably showing the conveying of a stream of products in a single line, of which one section arrives at the input of a downstream station in a single main zone delimited by primary beacons;

FIG. 2 schematically represents a simplified view in elevation of a second embodiment of said device, notably showing a unitary stream of products comprising, on the one hand, a first section at the input of a downstream station in a main zone delimited by primary beacons and, on the other hand, another, upstream section in an additional zone delimited by primary beacons situated at the start of said main zone and by additional primary beacons situated upstream;

FIG. 3 schematically represents a simplified view in elevation of a third embodiment of said device, notably showing the conveying of a stream of products in three lines successively in an additional zone and the main zone; and FIG. 4 schematically represents a simplified side view of FIG. 3, notably showing the detection and counting member covering said additional zone and said main zone. The present invention relates to the conveying of products 1 in an industrial line.

Such a product 1 is an individual object or several objects grouped together, notably in batch or bundle form. A product 1 is a container, such as a bottle or a flask, or even a brick pack or a can. Such a container is intended to contain, in a non-exhaustive manner, a fluid, a liquid, powders or granules, notably of agrifood or cosmetic type.

A product 1 can be made of any type of material, notably of plastic material, of metal or even of glass. A product 1 can be rigid or semi-rigid. It can have any type of form, symmetrical or not, regular or irregular.

The conveying of products 1 is performed in a direction of movement, essentially longitudinal, from upstream to downstream, between different stations dedicated to each treatment that the products 1 have to undergo.

Such transportation of products 1 is performed via a conveying device 2.

The device 2 makes it possible in principle to ensure the movement of a stream of products 1 between an upstream station 3 and a downstream station 4. In particular, the upstream station 3 can be a treatment unit, such as a filling unit, or else a surface for accumulating products 1, even another conveying means. The downstream station 4 can, for example, be a treatment unit, in particular for packaging several products 1 grouped together, notably a tight packing machine or a boxing machine, or else an accumulation surface, even another conveying means.

The conveying device 2 then comprises at least one conveyor 5. Such a conveyor 5 can be of any type, preferably provided with several endless belt mats. Several conveyors 5 can be arranged end-to-end one after the other, notably separated by a transfer plate. Several conveyors 5 can also be positioned alongside one another, transversely with respect to the longitudinal direction of movement. In particular, the conveying device 2 can comprise one conveyor 5 for each line of products 1 transported.

At the input, such a conveyor 5 is fed with products 1 by the upstream station 3 and, at the output, it supplies the downstream station 4 with products 1.

In particular, the conveyor 5 ensures the movement of the stream of products 1 in at least one line 6. Such unitary conveying is notably represented in FIGS. 1 and 2. The conveyor 5 can also ensure the transportation of a multiline stream, namely several lines 6 of products 1, the lines 6 extending longitudinally and parallel or substantially parallel to one another.

Advantageously, the invention provides for ensuring a supply of the downstream station 4 with a compact stream of products 1, meaning that the products 1 must be attached in each line one behind the other or as close as possible one behind the other, "nose-to-tail". Consequently, it is necessary to control this compact aspect of the stream of products 1 just before their arrival at the downstream station 4 for their treatment.

For this, the conveying device 2 comprises at least one main zone 7, covering a section of the stream in which certain aspects are checked, such as, in particular, the number of products 1 present.

It will be noted that a section of the stream extends transversely, over the entire width of said stream, and therefore of said conveyor 5, encompassing all the lines of products 1 and over a given length determined by the length of the corresponding zone 7. A stream then comprises several successive sections, abutting longitudinally with one another.

The conveying device 2 can comprise several zones extending along the conveyor 5. In particular, several zones can follow one another, spaced apart or attached longitudinally with respect to one another. Consequently, the main zone 7 is situated furthest downstream. In addition, each zone covers a different section of said stream of products 1 circulating in said conveying device 2.

Preferentially, the main zone 7 can comprise a downstream output end to a downstream station 4, in particular to a treatment station, preferably, a packaging station of tight packing or boxing machine type.

Such a main zone 7 is delimited by primary beacons 70, 71. The latter therefore form part of the conveying device 2.

Preferentially, said at least one main zone 7 is delimited by at least two primary beacons 70, 71 positioned at each upstream and downstream end of said main zone 7. In other words, at least one upstream primary beacon 70 corresponds to the start of the main zone 7, while at least one downstream primary beacon 71 corresponds to the end of said main zone 7. The main zone 7 is therefore located between the primary beacons 70, 71. Such a configuration with a main zone 7 delimited by two primary beacons 70, 71 can notably be seen in FIG. 4. Consequently, the main zone 7 is delimited by virtual straight lines passing through said primary beacons 70, 71 and extending transversely, preferably orthogonally, with respect to the longitudinal direction of movement of the products 1.

According to different embodiments, notably visible in FIGS. 1 to 3, the main zone 7 has an overall rectangular parallelepipedal form. The main zone 7 is then delimited by four beacons 70, 71, 700, 710 situated in its corners. In other words, on the one hand, an upstream primary beacon 70 situated on the left with respect to the direction of movement (i.e. at the top in the figures) and an upstream primary beacon 700 situated on the right (i.e. at the bottom), delimit the start of the main zone 7. On the other hand, a downstream primary beacon 71 situated on the left with respect to the direction of movement (i.e. at the top) and a downstream primary beacon 710 situated on the right (i.e. at the bottom), delimit the end of the zone 7. Furthermore, the upstream beacons 70, 700 are positioned opposite one another, namely in alignment transversely with respect to the direction of movement. The same applies for the downstream primary beacons 71, 710.

Furthermore, one or more of the primary beacons 70, 700, 71, 710 can be mounted by fixing onto a suitable structure, such as, for example, directly onto the frame of the conveyor 5 or else on rails provided for that purpose, added to the conveying device 2. Such fixing can be designed to be removable or adjustable, notably in order to set the separation, in one case, between the upstream primary beacon 70 and the downstream primary beacon 71, thus modifying the width of the main zone 7, or else, in another case, between the upstream primary beacons 70, 700 and the downstream primary beacons 71, 710, increasing or reducing the length of the main zone 7.

Similarly, one or more of the primary beacons 70, 700, 71, 710 can be adjustable in height, notably with respect to the plane of transportation of the products 1, extending parallel or essentially parallel to the surface of the conveyor 5.

Advantageously, the invention provides for determining the number of products 1 present in at least said main zone 7.

In particular, said main zone 7 can be a zone whose dimensions are known and in which there are wanted to be a certain number of products 1. For example, it may be desirable, for correct operation of a downstream station 4, for, in each line 6, the products to be accumulated, that is to say for each product 1 to be in contact with the product 1 directly following it. More specifically, it is possible to choose the length of the zone 7 so that it corresponds to the length over which there is a desire for the products to be accumulated in each line 6. Consequently, the number of products 1 theoretically present in the main zone 7 is then determined, in order to appropriately feed the downstream station 4. It is then necessary to check that the exact number of products 1 located in the main zone 7 does indeed correspond to the theoretical number.

To do this, the conveying device 2 comprises at least one member 8 for detecting said primary beacons 70, 700, 71, 710 and for counting the number of products 1 per zone, in particular at least in said main zone 7. Advantageously, the member 8 is situated above said conveyor 5. Consequently, said member 8 can, from above, detect and count all the products 1 present in said at least main zone 7.

Several members 8 can be envisaged covering one or more zones.

According to one embodiment, said at least one member 8 is positioned elevated with respect to said conveyor 5 and comprises at least one beam 80 covering at least said main zone 7. Said beam 80 can cover one or more lines 6 of said main zone 7. An example of a beam covering said main zone 7, but also another zone situated upstream, is notably represented in FIG. 4.

Said at least one member 8 can be of any type. For example, said member 8 can be a pulse emitter, notably electromagnetic, an optical detector, such as a laser; this member 8 can then interact with labels or marks applied to each of said products 1, in order to count them, still when they are located in said main zone 7.

According to a preferential embodiment, the member 8 is a camera. The counting of the products 1 can then be performed by computer processing. More particularly, the camera takes successive images of at least one zone. These images are analyzed by comparison to previously stored images of given products 1, in order to perform a recognition of the profiles of the products 1 transported and thus count them at a given instant in a zone, in particular the main zone 7. The recognition by camera makes it possible to take into consideration multiple parameters, such as the characteristics linked to the products 1, namely, notably, several dimensions, above all the length and/or the width, their form, their colors, the plugging elements, etc. Obviously, the camera can also recognize the products 1 by the fact that the characteristics thereof are previously stored.

Furthermore, the detection by a member 8 of camera type makes it possible to easily adapt to a change of format of the products 1 to be conveyed. Indeed, the recognition performed by the camera makes it possible to determine the format of the products 1, in particular to know its dimensions, notably in order to set the conveying device 2 and its various elements, automatically or else manually by informing an operator of the settings to be made.

Furthermore, such detection by camera is performed permanently, without downtime periods, making it possible to know, at any instant, the number of products 1 recognized and counted.

In addition, such a visual recognition can be applied to the primary beacons 70, 700, 71, 710, in order to detect them and to delimit the main zone 7, in order to count only the products 1 recognized by the camera in this main zone 7.

To this end, the primary beacons 70, 700, 71, 710 can be of any type. Preferentially, they are formed or comprise an element ensuring their detection by the member 8, preferentially by a camera.

As an example, a primary beacon 70, 700, 71, 710 can be a block or a marker, with a specific form, a particular pattern or even a distinct visual color. A primary beacon 70, 700, 71, 710 can notably comprise a reflector acting on at least one wavelength of the beam 80 of the member 8, to ensure the highlighting of said primary beacon 70, 700, 71, 710 upon detection.

According to one embodiment, as can be seen in FIGS. 2 to 4, the conveying device 2 comprises an additional zone 9 situated upstream of said main zone 7. Such an additional zone 9 covers another section situated upstream and that is distinct with respect to the section covered by the main zone 7. This other section also covers the entire width of the stream circulating through the conveying device 2. Furthermore, the main zone 7 and the additional zone 9 then cover two sections over the entire width of the stream of products 1, preferentially two successive sections when the zones 7, 9 are joined end-to-end.

The main zone 7 and the additional zone 9 are necessarily distinct. Their surfaces may overlap but they are preferentially not superposed.

In addition, like the main zone 7, said second additional zone 9 is delimited by primary beacons. The latter therefore form part of the conveying device 2.

The additional zone 9 can have a form similar to that of the main zone 7, with lengths that can be distinct. The beacons of the additional zone 9 can be fixed in the same way as for the main zone 7.

Preferentially, the additional zone 9 is delimited downstream by at least one upstream primary beacon 70, 700 of said main zone 7 and by at least one additional primary beacon 90 situated upstream of the additional zone 9. In this case, the main zone 7 and the additional zone 9 follow directly one after the other, namely they are contiguous, the end of the additional zone 9 being attached to the start of the main zone 7. In short, the additional zone 9 shares its at least one downstream beacon with at least one upstream primary beacon 70, 700 of the main zone 7.

Further, with reference to FIGS. 2 and 3, the additional zone 9 can be delimited, at its downstream end, by the left primary upstream beacon 70 (i.e. at the top in the figures) and by the right primary upstream beacon 700 (i.e. at the bottom), while, at its upstream end, respectively by a left upstream additional primary beacon 90 (i.e. at the top) and a right upstream additional primary beacon 900 (i.e. at the bottom).

According to another embodiment, not represented, the additional zone 9 is separate from the main zone 7. The additional zone 9 then comprises at least two primary beacons, more specifically additional primary beacons, each at one end and delimiting the start and the end of said additional zone 9, notably via virtual straight lines extending transversely and passing through each of said two additional beacons.

Preferentially, according to this embodiment, the additional zone 9 comprises four additional primary beacons which are specific to it, each of the four primary beacons being positioned in each of the corners of said additional zone 9, namely the left upstream additional primary beacon 90 (i.e. at the top) and the right upstream additional primary beacon 900 (i.e. at the bottom), but also a left downstream additional primary beacon (i.e. at the top) and a right downstream additional primary beacon (i.e. at the bottom).

Consequently, in either case, according to one embodiment, the member 8 makes it possible to ensure the detection of the primary beacons 70, 700, 90, 900 of the additional zone 9 and to count the products 1 located therein. In particular, the beam 80 of the member 8 covers also at least the additional zone 9, whether it is contiguous to or separate from the main zone 7.

According to another embodiment, said additional zone 9 can have its own member 8 for detecting the corresponding primary beacons and counting the products 1 that are located therein.

It will be noted that an additional primary beacon 90, 900 can be of the same type as a primary beacon 70, 700, 71, 710 such as detailed previously. It can be identical or have different detection characteristics.

Thus, the invention makes it possible to know the quantity and the positions of the products 1 upstream of the main zone 7, in order to perform any adjustments in case of products 1 counted in insufficient or excessive quantities. Indeed, the counting of the products in an additional zone 9 upstream of the main zone makes it possible to check that the feed of products 1 is correct to obtain the desired number of products in the zone 7 and thus anticipate a potential regulation. Indeed, an excessive number of products 1 in the additional zone 9 is likely to lead to a prejudicial accumulation, notably provoke a jam at the downstream station 3. Conversely, an insufficient quantity of products 1 in the additional zone 9 can affect the operation of a downstream station 4. The adjustments make it possible to maintain the characteristics desired or required for the stream of products 1 in the main zone 7. One example of adjustment can consist in performing a regulation by controlling the speed of the conveyor 5 or of an additional conveyor specific to the additional zone 9, notably accelerating said additional conveyor or the conveyor 5, to induce an accumulation of the products 1 if there are too few of them in the additional zone 9, and vice versa. It is also possible to provoke the stopping of said conveyor 5 to force an accumulation of the products 1, or even order an intervention in order to add or eliminate one or more products 1, or even to push them, manually by an operator or else by suitable automated means.

It will be noted that, for traceability reasons, it is preferable to remove a product 1, to retain the "first in, first out" (FIFO) nature of the production stream, rather than to add a product 1, the origin of which is uncertain and unordered.

In short, a determined number of products 1 is wanted in the main zone 7 and counting the products in the additional zone 9 makes it possible to know in advance whether the quantity desired in the main zone 7 will be observed and to intervene accordingly if such is not the case.

According to another embodiment, a line 6 of products 1 is delimited by secondary beacons. The latter therefore form part of the conveying device 2.

Such secondary beacons can correspond to the primary beacons 70, 700, 71, 710, 90, 900.

When said stream comprises several lines 6 of products 1, that is to say, when the stream is multiline, two adjacent lines 6 can be delimited by at least two secondary beacons 10, 11. In particular, two adjacent lines are delimited by at least one upstream secondary beacon 10 and at least one downstream secondary beacon 11. The zone or zones 7, 9 are therefore subdivided into subzones using secondary beacons 10, 11 which separate and determine the lines 6. In short, the zone or zones 7, 9 are divided into so many longitudinal slices corresponding to the lines 6. Once again, based on the number and the position of the lines 6, some of the secondary beacons 10, 11 may coincide with the primary beacons 70, 700, 71, 710, 90, 900.

In addition, said two secondary beacons 10, 11 are aligned longitudinally or substantially longitudinally.

Preferentially, as can be seen in FIG. 3, an upstream secondary beacon 10 and a downstream secondary beacon 11 are situated close to, even at, the upstream and downstream ends of the zone or zones 7, 9. Thus, when there is a main zone 7 and an additional zone, the upstream secondary beacon or beacons 10 can be located in the upstream part of the additional zone 9 and the downstream secondary beacon or beacons 11 can be located in the downstream part of the main zone 7.

Consequently, two lines 6 situated side-by-side over the width of the conveying device 2 are separated by a virtual straight line passing through said secondary beacons 10, 11.

Consequently, the secondary beacons 10, 11 make it possible to longitudinally subdivide the main zone 7 and/or the additional zone 9 into subzones each covering one line 6 of products 1 of said stream.

In particular, each subzone of a zone 7, 9 can correspond to the portion of a line 6 extending over the length of the zone 7, 9 concerned. Said member 8 then ensures also the detection of said secondary beacons 10, 11. The member 8 then makes it possible to recognize each line 6 and to count the products 1 which are situated in each line 6, on either side of the axis passing through the secondary beacons 10, 11.

Preferably, each line 6 is delimited by at least two pairs of longitudinally aligned secondary beacons 10, 11, said pairs being positioned on either side of each line 6.

It will be noted that a secondary beacon 10, 11 can be of the same type as a primary beacon 70, 700, 71, 710, or different. It can be identical or have different detection characteristics.

As explained previously, based on the number and the position of the secondary beacons 10, 11, it is possible to count, independently for each zone 7, 9, the products 1 in each line 6, regardless of the configuration of the zones 7, 9.

Like the primary beacons 70, 700, 710, 90, 900, the secondary beacons 10, 11 can be designed to be adjustable transversely with respect to the conveying device 2, in particular the structure thereof and its conveyor 5. This is particularly useful for a change of format which modifies the width of the lines 6.

Likewise, the height of the secondary beacons 10, 11 can be set.

An upstream secondary beacon 10 and a downstream secondary beacon 11 can be linked, so that the transverse movement of one induces the same movement of the other. Each line 6 therefore remains longitudinally aligned.

According to one embodiment, the conveying device 2 comprises longitudinal guides, delimiting a guiding corridor for each line 6 of products 1. Consequently, as can notably be seen in FIG. 3, said secondary beacons 10, 11 are fixed onto longitudinal guides 12. In short, each line 6 is delimited by two guides 12, situated on the left and on the right. Furthermore, two adjacent lines 6 can share a common guide 12 and are considered as such through the detection of the secondary beacons 10, 11 positioned on a corresponding guide 12.

Such longitudinal guides 12 can take the form of rods, or else plates or sheets, positioned vertically. Two guides 12 are parallel or substantially parallel to one another. Two guides 12 are spaced apart by a separation determined according to a dimension of the products 1 to be transported, allowing for play, so as to keep the products 1 aligned longitudinally.

Indeed, according to one embodiment, such guides 12 can be adjusted transversely, manually or automatically, when changing the format of the products 1 to be treated. Consequently, it is not necessary to set the position of the secondary beacons 10, 11, since they are placed on the guides 12 and it is the positions thereof which are set.

Thus, the invention makes it possible to count the products 1 present in each line 6 and to know the composition of the stream over its width and detect the presence of a possible imbalance in one of the lines 6 of products 1 and intervene if necessary in each zone 7, 9 and for each line 6, as explained previously. In particular, the intervention can consist in adding or removing one or more products 1 to or from a line 6 which comprises a number of products different from that of the other lines 6.

Further, according to one embodiment, the conveying device 2 comprises means for comparing the number of products of each zone 7, 9 and of each line 6 to a determined value. Such comparison means can be software, executed by dedicated computing means: the determined value for each zone 7, 9 and for each line 6 is therefore stored previously, for example in a database manager, in order to be compared with one and/or the other of the values measured in real time by the invention, in particular by the member 8, in each zone 7, 9 and each corresponding line 6. In the event of a comparison difference, it is therefore then possible to intervene.

Further, for a multiline stream, it is thus possible to know the number of products 1 in each line 6, notably in the additional zone 9, and to compare each line 6, to ensure that one does not contain more products 1 than another, even if the products 1 of one and/or the other of the lines 6 are not evenly positioned over the length of said additional zone 9.

In order to intervene, said comparison means then comprise a notification issuing means. Such a notification can simply be an alert, displayed on a station, like the central control unit of the installation or of a station, notably the upstream station 3 or the downstream station 4. This notification can also be sent to a portable terminal, held by an operator, in order for him or her to be able to intervene manually to either modify the operation of the conveying device 2, such as controlling the speed of the conveyor 5 or triggering a suitable means notably to add or remove a product in a zone 7, 9, if necessary in a given line 6, or to intervene manually to add, remove or push products 1 in a line 6. The notification can also correspond to a control signal of said suitable means, to intervene directly without an operator.

Thus, it is possible, on the one hand, to regulate the transportation of the stream of products 1 in the zone or zones 7, 9, above all in the additional zone 9, through control of the speed of advance of the conveyor 5, when the number of products 1 does not correspond to the number desired in the zone or zones 7, 9. Also, in the case of a multiline stream, it is possible to order an intervention to rebalance one of the lines 6 in one and/or the other of the zones 7, 9, by the addition or extraction of products 1, so that, in each zone 7, 9, each line 6 has the same number of products 1.

The invention relates also to a method for conveying products 1 in an industrial line.

Such a conveying method can preferentially be adapted to the implementation of the conveying device 2, as previously described.

Such a conveying method comprises at least the following steps.

First of all, a conveyor 5 is used to transport a stream of products 1 in at least one line 6. The stream can then be a single line as can be seen notably in FIGS. 1 and 2.

As described previously, the stream can comprise several lines 6 of products 1, as can notably be seen in FIG. 3.

Advantageously, primary beacons 70, 700, 71, 710 are used to delimit a main zone 7 covering a section of said stream, namely a part of the length of the stream of products 1 over its entire width.

In addition, said primary beacons 70, 700, 71, 710 are detected and the number of products 1 is counted at least in said main zone 7.

The number of products 1 of said main zone 7 can then be compared to at least one determined value, then a notification is issued based on said comparison.

Furthermore, when said notification is issued, it is possible to control the speed of said at least one conveyor 5 based on the number of products 1 counted per zone 7 and for said at least one line 6, in order, for example, to ensure an accumulation at least in said main zone 7.

Obviously, if the result of the comparison is valid, i.e. it matches the expectations, it is then possible to inform as to the right quantity of products 1 counted, for example by displaying the number of products 1 counted, as on the screen of a dedicated terminal. According to one embodiment, additional primary beacons 90, 900 are used to delimit an additional zone 9 upstream of said main zone 7. The number of products 1 is then counted in said additional zone 9. In addition, the additional beacons 90, 900 are detected.

The additional zone 9 then covers another section of said stream, situated upstream of said main zone 7.

According to one embodiment, when the stream is multiline, secondary beacons 10, 11 are used to delimit two adjacent lines 6 of products 1. Preferentially, each line 6 is delimited by at least two pairs of longitudinally aligned secondary beacons 10, 11, said pairs being positioned on either side of each line 6. Said secondary beacons 10, 11 are then detected and the products 1 of each line 6 are counted.

In short, the primary beacons 70, 700, 710, 90, 900 and the secondary beacons 10, 11 are detected so as to determine virtual areas for limiting the counting of the products 1 to those which are located therein.

The invention, through its conveying device 2 and its conveying method, makes it possible to know in real time and with precision the number of products 1 present at a location of an industrial production line, in dedicated zones 7, 9 and for each line within the zones 7, 9. It is thus notably possible to detect:
- an imbalance between the lines 6, in terms of number of products 1, or even;
- an excessively fast or slow supply of the products;
- these problems being likely to result in a malfunction or affect the optimal operation of the line, in particular of the downstream station 4. Thus, by virtue of the invention, it is possible to be alerted as early as possible, reducing the intervention time.

The invention claimed is:

1. A device (2) for conveying products (1) in an industrial line, comprising at least one conveyor (5) transporting a stream of products (1) in at least one line (6);
wherein said conveying device (2) comprises:
at least one main zone (7) delimited by primary beacons (70, 700, 71, 710) and covering a section of said stream; and
above said conveyor (5), at least one member (8) for detecting said primary beacons (70, 700, 71, 710) and for counting the number of products (1) at least in said main zone (7).

2. The conveying device (2) as claimed in claim 1, wherein said main zone (7) is delimited by at least two primary beacons (70, 700, 71, 710) positioned at each upstream and downstream end of said main zone (7).

3. The conveying device (2) as claimed in claim 1, further comprising an additional zone (9) situated upstream of said main zone (7) and covering another section of said stream; said additional zone (9) being delimited by at least one primary beacon (70, 700) of said main zone (7) and by at least one additional primary beacon (90, 900) situated at the upstream end of said additional zone (9); said member (8) ensuring the detection of said at least one additional primary beacon (90, 900) and the counting of the number of products (1) in said additional zone (9).

4. The conveying device (2) as claimed in claim 1, wherein said stream comprises several lines (6) of products (1); each line (6) being delimited by at least two pairs of longitudinally aligned secondary beacons (10, 11), said pairs being positioned on either side of each line (6); said member (8) ensuring the detection of said secondary beacons (10, 11) and the counting of the number of products (1) for each of said lines (6).

5. The conveying device (2) as claimed in claim 4, wherein comprises longitudinal guides (12), delimiting a guiding corridor for each line (6) of products (1); said secondary beacons (10, 11) being fixed onto said longitudinal guides (12).

6. The conveying device (2) as claimed in claim 1, wherein the main zone (7) comprises a downstream output end to a downstream station (4).

7. The conveying device (2) as claimed in claim 1, further comprising a means for comparing the number of products (1) of each zone (7, 9) and of each line (6) to at least one determined value; said comparison means comprising a notification issuing means.

8. The conveying device (2) as claimed in claim 1, wherein said detection and counting member (8) comprises at least one beam (80) covering at least said main zone (7).

9. The conveying device (2) as claimed in claim 8, wherein said detection and counting member (8) is a camera.

10. A method for conveying products (1) in an industrial line, wherein at least one conveyor (5) is used to transport a stream of products (1) in at least one line (6);
the method comprising:
primary beacons (70, 700, 71, 710) are used to delimit at least one main zone (7) covering a section of said stream;
said primary beacons (70, 700, 71, 710) are detected and the number of products (1) is counted at least in said main zone (7).

11. The conveying method as claimed in claim 10, wherein:
additional primary beacons (90, 900) are used to delimit at least the upstream end of an additional zone (9) upstream of said main zone (7);
said additional primary beacons (90, 900) are detected; and
the number of products (1) in said additional zone (9) is counted.

12. The conveying method as claimed in claim 10, wherein said stream comprises several lines (6),
each line (6) is delimited by at least two pairs of longitudinally aligned secondary beacons (10, 11), said pairs being positioned on either side of each line (6);
said secondary beacons (10, 11) are detected and the products (1) of each line (6) are counted.

13. The conveying method as claimed in claim 10, wherein the number of products (1) of each zone (7, 9) and of each line (6) is compared to at least one determined value; and a notification is issued based on said comparison.

14. The conveying device (2) as claimed in claim 2, further comprising an additional zone (9) situated upstream of said main zone (7) and covering another section of said stream; said additional zone (9) being delimited by at least one primary beacon (70, 700) of said main zone (7) and by at least one additional primary beacon (90, 900) situated at the upstream end of said additional zone (9); said member (8) ensuring the detection of said at least one additional primary beacon (90, 900) and the counting of the number of products (1) in said additional zone (9).

15. The conveying device (2) as claimed in claim 2, wherein said stream comprises several lines (6) of products (1); each line (6) being delimited by at least two pairs of longitudinally aligned secondary beacons (10, 11), said pairs being positioned on either side of each line (6); said member (8) ensuring the detection of said secondary beacons (10, 11) and the counting of the number of products (1) for each of said lines (6).

16. The conveying device (2) as claimed in claim 2, wherein the main zone (7) comprises a downstream output end to a downstream station (4).

17. The conveying device (2) as claimed in claim 2, further comprising a means for comparing the number of products (1) of each zone (7, 9) and of each line (6) to at least one determined value; said comparison means comprising a notification issuing means.

18. The conveying device (2) as claimed in claim 2, wherein said detection and counting member (8) comprises at least one beam (80) covering at least said main zone (7).

19. The conveying method as claimed in claim 11, wherein said stream comprises several lines (6),
each line (6) is delimited by at least two pairs of longitudinally aligned secondary beacons (10, 11), said pairs being positioned on either side of each line (6);
said secondary beacons (10, 11) are detected and the products (1) of each line (6) are counted.

20. The conveying method as claimed in claim 11, wherein the number of products (1) of each zone (7, 9) and of each line (6) is compared to at least one determined value; and a notification is issued based on said comparison.

* * * * *